United States Patent [19]
Yamamichi

[11] 3,827,067
[45] July 30, 1974

[54] AUTOMATIC WIND-UP DEVICE FOR A CAMERA HAVING A MEMORY TYPE EXPOSURE CONTROL DEVICE

[75] Inventor: Masayoshi Yamamichi, Sagamihara, Japan

[73] Assignee: Canon Kabushiki Kaisha, Tokyo, Japan

[22] Filed: July 5, 1973

[21] Appl. No.: 376,828

[30] Foreign Application Priority Data
July 5, 1972 Japan.................................. 47-67402

[52] U.S. Cl. ............................................. 354/51
[51] Int. Cl. ............................................. G03b 7/08
[58] Field of Search...................... 95/10 CT, 31 EL

[56] References Cited
UNITED STATES PATENTS
3,640,201  2/1972  Kimura............................ 95/31 EL Primary Examiner—Samuel S. Matthews
Assistant Examiner—Michael L. Gellner
Attorney, Agent, or Firm—Toren, McGeady and Stanger

[57] ABSTRACT

An automatic wind-up device for a camera having a memory type exposure control device which allows change over between continuous photographing and single frame photographing, wherein when changed over to continuous photographing the photometrically sensed value of a first one frame is memorized and subsequent photographing is done based on said memorized value, thus a series of photographing is done while when changed over to single frame photographing, photometrically sensed value is memorized for each frame photographed for conducting photographing.

4 Claims, 3 Drawing Figures

AUTOMATIC WIND-UP DEVICE FOR A CAMERA HAVING A MEMORY TYPE EXPOSURE CONTROL DEVICE

BACKGROUND OF THE INVENTION

1. Field of the Invention

The present invention relates to an automatic wind-up device for a camera having a memory type exposure control device which is particularly useful when an electrically driven wind-up device is employed in a TTL sensing single lens reflex EE camera with a memory type electronic shutter.

2. Description of Prior Art

When photographing is done with a conventional TTL single lens reflex EE camera having a memory type electronic shutter with an electrically driven wind-up device attached thereto, it has such shortcoming that in the case its photographing interval is of continuous photographing, every time a release is made for photographing an automatic diaphragm at a camera side and function of a mirror work and a built in light receiving element will have its brightness on a light receiving element plane varied by the action of the automatic diaphragm and the mirror, then resuming the state at the beginning of photographing and the brightness on the plane of the light receiving element will return to its original state, and at this time as its length of time in the cycle is short, if it is shorter than the response time of the light receiving element the amount of information from the light receiving element varies, thus proper exposure cannot be obtained.

The first object of the present invention is to eliminate the above mentioned shortcomings by memorizing first one frame only, in the case when photographing intervals is of continuous photographing, so that subsequent photographing is carried out with the memory of the first one frame retained, thus a series of photographing is done with the exposure value sensed before starting the photographing.

The second object of the present invention is to memorize the photometrically sensed value every time a single frame is photographed for conducting photographing when photographing interval is of single frame photographing.

The third object of the present invention is to have a change over switch at the camera side which automatically works when a camera is used without an electrically driven wind-up device attached to the camera, so that ordinary photographing can be done.

DESCRIPTION OF THE PREFERRED EMBODIMENTS

Figure 1:
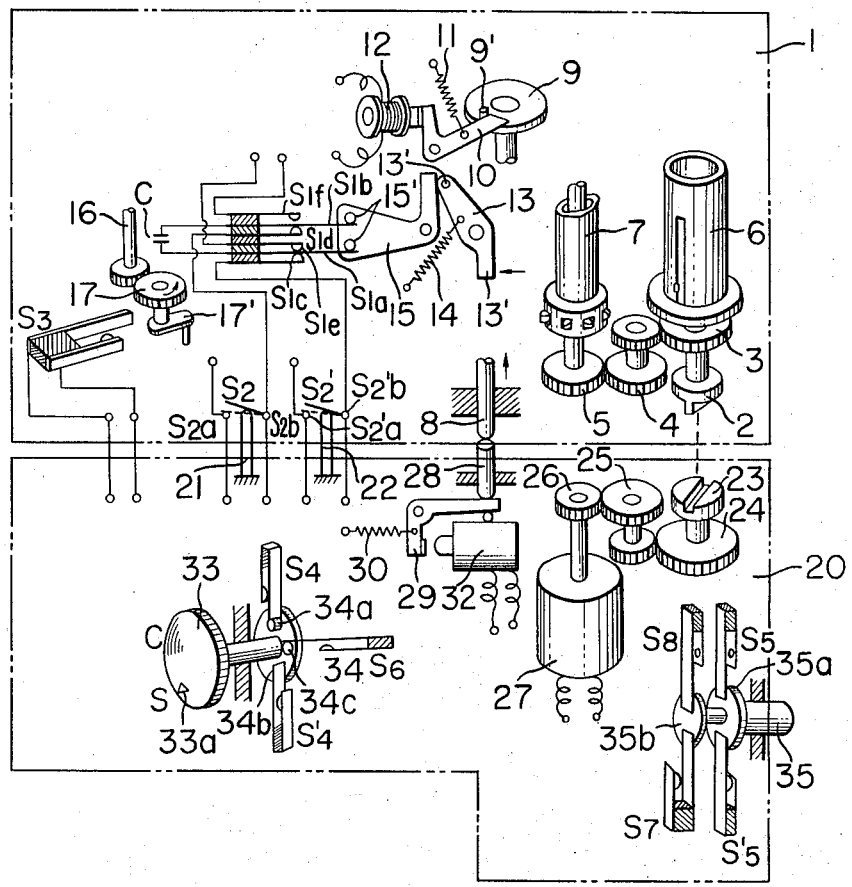
FIG. 1 shows an example of the present invention, and is an arrangement drawing for an entire device.

One example of the present invention shall be explained referring to the drawings. FIG. 1 is to show the arrangement of the entire device, wherein 1 is a main body of a camera, 2 is a linking connecting piece for wind-up, 3, 4, 5 are driving gears for wind-up system, and 6 is a spool for taking up film, and is connected with the axle of the connecting piece 2 in a conventionally known method. 7 is a sprocket and is connected with the axle of the gear 5. The gear 5 is also connected with a shutter driving system which is not shown in the drawing in a conventionally known method so that the driving is transmitted from the wind-up system. 8 is a release pin at the camera side slidably mounted to the camera 1, and is to conduct releasing of the camera by a known method. 9 is a gear in a rear screen system of a shutter, 9' is a pin planted on the rear screen gear 9. 10 is a lever to check the pin 9' of the rear screen gear 9, and this lever 10 has its one end contact with an electro-magnet 12 for holding rear screen by a spring 11 which is placed over said lever 10. A spring, not shown in the drawing, for running the rear screen is attached to the rear screen system 9, and the spring 11 is so made as having considerably smaller strength than that of said spring. 13 is an automatic diaphragm linking lever which is actuated by an automatic diaphragm (not shown in the drawing) at the camera side, and one end part 13' of said automatic diaphragm linking lever 13 is linked with the automatic diaphragm at the camera side. The automatic diaphragm is provided in a conventionally known method and has such structure that it is stopped down to the intended aperture which is set before starting the shutter and returns to the original fully released aperture position at the time when the shutter completes its running, therefore the linking lever 13 makes same movement as that of the automatic diaphragm as it is linked with the automatic diaphragm. 13'' is a pin planted on the linking lever 13 and is to rotate a memory change over switch lever 15. 14 is a spring placed over the linking lever 13 and is to push down, through the pin 13'', memory change over switch contacting pieces $S_{1a}$, $S_{1b}$ against their springiness by electrically insulated a pin 15' provided on the memory change over switch lever 15 so that the $S_{1a}$ contacts and is conducted through with the $S_{1c}$, and the $S_{1b}$ with the $S_{1d}$. By the release of the camera, the function of the automatic diaphragm will be such that the contacting pieces $S_{1a}$, $S_{1b}$ are changed over to $S_{1e}$, $S_{1f}$ through the levers 13, 15.

Switches $S_2$ and $S'_2$ are related with the above mentioned memory change over switch $S_1$, being connected to $S_{1c}$ and $S_{1d}$ at their one ends, and the switches $S_2$, $S'_2$ become OFF only when an electrically driven wind-up device 20 is attached, by insulating pins 21, 22 planted on the electrically driven wind-up device 20. 16 is a rear screen axle connected with the rear screen system 9 with the screen, ribbon (not shown in the drawings), and the device is so constructed that one end of the axle engages with a gear 17 to which an arm 17' is integrally provided. As the shutter screen runs the rear screen system 9 transmits the rotation to the rear screen axle 16, while the gear 17 rotates to counterclockwise direction and the insulating pin on the arm 17' places the switch $S_3$ in ON state. The switch $S_3$ is placed in ON state near the position where the rear screen system 9 of the shutter completes runs.

The parts to be described now are provided at the electrically driven wind-up device 20 side. 23 is a connecting piece which is coupled with the linking connecting piece 2 for wind-up at the camera 1 side. 24, 25, 26 are driving gears to transmit the rotation of a motor 27. There is such structure provided between the motor 27 and the connecting piece 23, although not shown in the drawing, to issue a signal when the wind-up is completed for stopping the rotation of the motor 27.

28 is a release pin which is linked with the pin 8 provided at the camera 1 side and is slideably moved by a release linked lever 29. 30 is a spring placed over the release linked lever 29. 31 is a stopper for the release lever 29. 32 is an electro-magnet for release to push up the release pin 8 of the camera 1. 33 is a knob to change over a single frame feeding S and a continuous feeding C of the electrically driven wind-up device. 33a is a pointer mark to indicate change over. 34 is a change over switch disk fixed to the change over knob 33 and has insulating pins 34a, 34b, 34c planted thereon. Switches $S_4$, $S'_4$ have switch terminals $S_{2a}$, $S_{2b}$, and $S'_{2a}$, $S'_{2b}$, respectively, of the above mentioned switches $S_2$, $S'_2$ connected thereto. $S_6$ is a switch which is connected in series with the motor 27 of the electrically driven wind-up device 20, and when the switch $S_6$ is ON continuous feeding is done. 35 is a release button of the electrically driven wind-up device 20 and can be pressed from outside of the electrically driven wind-up device 20. 35a, 35b are insulating disks being made integrally with the release button 35, and actuate switches $S_5$, $S'_5$ and $S_7$, $S_8$. The switches $S_5$, $S'_5$ are connected to the switches $S_2$, $S'_2$ in parallel with the above mentioned switches $S_4$, $S'_4$. $S_7$ is a switch to have the electro-magnet 32 conducted through. $S_8$ is a switch actuated in an association with the switch $S_7$ to place the circuit of the motor in OFF state.

Figure 2:
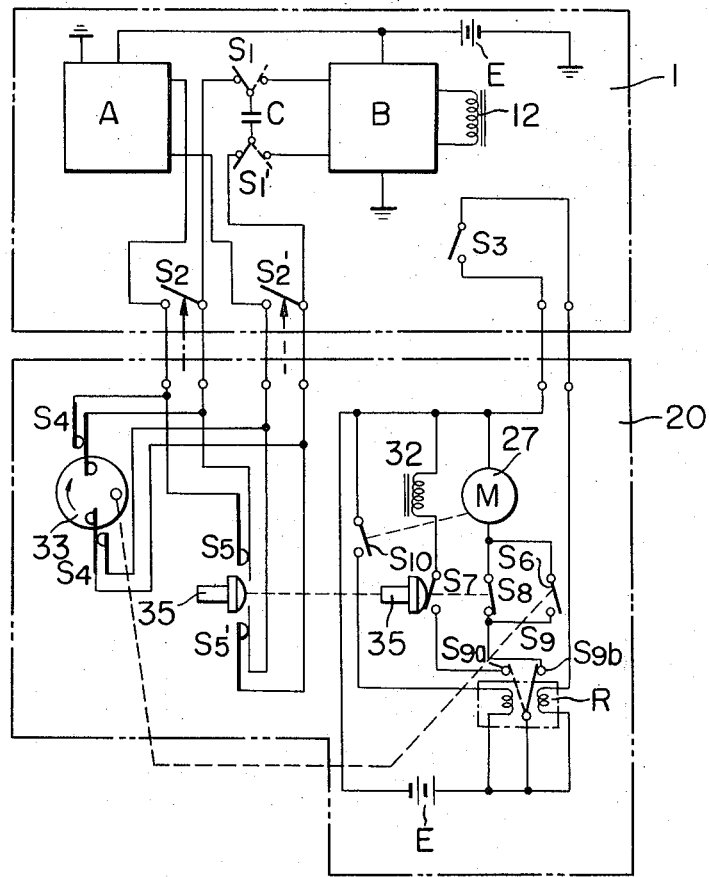
FIG. 2 is an electric circuit diagram for the device shown in FIG. 1.

The circuit diagram shown in FIG. 2 is to show an exposure time control of a camera applied to the arrangement shown in FIG. 1. In FIG. 2, E is a power source, A is an information input circuit built in the camera 1, and receives information on a light receiving element 47, diaphragm signal, film sensitivity signal. B is a high impedance input regeneration circuit for regeneration of shutter time, changing over the capacitor C for memorizing. This memorizing capacitor C is of such type as always retaining the amount of information which has been put in so far whenever information from the information input circuit A is not put in. This is such method as has been disclosed by the present applicant in his previously filed Japanese Patent applications (Sho 45-6146, Sho 45-23942, and Sho 45-43511). R is a latching relay, consisting of a shutter rear screen completion signal switch $S_3$ and a wind-up completion signal switch $S_{10}$ which is linked with the motor 27, and a switch contacting piece $S_9$ is conducted through with $S_{9a}$ as the wind-up completion signal switch becomes ON, while it is changed over from $S_{9a}$ to $S_{9b}$ as the shutter completion signal switch $S_3$ becomes ON.

Since the above mentioned switch $S_3$ and the switch $S_{10}$ are so made as not to work simultaneously, the switch $S_9$ is always conducted through with either one of the sides.

Figure 3:
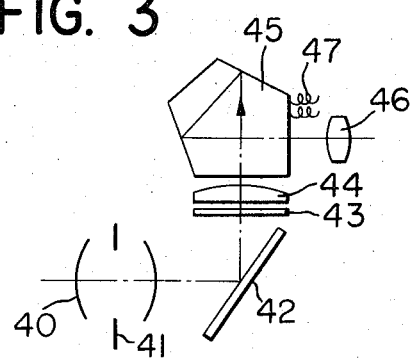
FIG. 3 is an optical arrangement drawing of the camera shown in FIG. 1.

FIG. 3 is to show an optical system of the camera shown in FIG. 1 above, wherein 40 is a photographing lens, 41 is a diaphragm, 42 is a reflective mirror, 43 is a focal plane, 44 is a condensor lens, 45 is a pentagonal prism, 46 is an eye piece, and 47 is a light receiving element to sense the penetrating light from the photographing lens.

Now, the function of the device of the present invention with the above mentioned arrangement shall be explained.

The phase shown in FIG. 1, FIG. 2 is the state before the completion of wind-up at the time of single frame photographing. The driving power of the motor 27 performs feeding of film and charging of shutter through gears 26, 25, 24, connecting pieces 23, 2, and gears 3, 4, 5, and as the wind-up at the camera 1 side and charging of shutter are completed, the motor 27 issues a wind-up completion signal placing the switch $S_{10}$ in ON state, then the switch $S_9$ of latching relay R is changed over from $S_{9b}$ to the position $S_{9a}$ shown by dotted line, and the motor circuit is cut out and conducted through with the release circuit. The camera 1 and the electrically driven wind-up device 20 will be stopped at this state. As the release button 35 is pressed, the switch $S_7$ becomes ON and the releasing electro-magnet 32 works, attracting the release lever 29 against the spring 30, then the release of the camera 1 is done through the pins 28, 8. As the release of the camera 1 is done one end 13' of the automatic diaphragm linking lever 13 is pushed to the direction of an arrow against the spring 14, and through the 13'' the memory change over switch lever 15 is rotated in clockwise direction by the spring power of the memory change over switch contacting pieces $S_{1a}$, $S_{1b}$, and the memory change over switch contacting piece $S_{1a}$ is changed over from the conductance to $S_{1c}$ to $S_{1e}$. In a similar manner $S_{1b}$ is changed over from the conductance to $S_{1d}$ to $S_{1f}$. In this state as the pointer mark 33a on the change over know 33 of the electrically driven wind-up device 20 is set to the position of single frame photographing S, the switches $S_4$, $S'_4$ are placed in ON state, and as the electrically driven wind-up device 20 is attached to the camera 1, even if the insulating pins 21, 22 push up the switches $S_2$, $S'_2$ creating the state of OFF, the information from the information input circuit A of the camera 1 is stored in the capacitor C as the switches $S_4$, $S'_4$ become ON as mentioned above. While the switches $S_5$, $S'_5$ become OFF as the release button 35 is pressed, since $S_4$, $S'_4$ and $S_5$, $S'_5$ are placed in parallel with each other, no effect is given to the camera 1 side.

As the memory change over switch $S_1$ is changed over as mentioned above, the capacitor C is changed over from the information input circuit A to the high impedance input regeneration circuit B. And the automatic diaphragm actuates the automatic diaphragm linking lever 13 and at the same time actuates the automatic diaphragm mechanism itself, causing the mirror to jump up and further, the front screen of the shutter to run. At this time the count starting switch (not shown in the drawing) of the electronic shutter is actuated, and the high impedance input regeneration circuit B will have, depending on the memorized voltage of the capacitor C, the conductance of the rear screen holding electro-magnet 12 cut out, releasing the attracting power, and the pin 9' of the rear screen gear 9 pushes the rear screen checking lever 10 out against the spring 11, causing the rear screen to run. The rear screen axle 16 rotates in an association with the rear screen system 9, and the gear 17 rotates in counterclockwise direction, then the pin of the arm 17' places the switch $S_3$ in ON position at the position where the rear screen completes its running. At this time the gear 17 conducts release of the stop down of the automatic diaphragm mechanism and return of mirror through the 17' by a conventionally known method which is not shown in the drawing. As the automatic diaphragm mechanism is released, the lever 13 rotates the lever 15 in counter-clockwise direction through the pin 13" by the spring 14, returning the memory change over switch contacting pieces $S_{1a}$, $S_{1b}$ to their original positions, thus conducted through to the information input circuit A and stopped at the original state. As the switch $S_3$ becomes ON the switch $S_9$ of the latching relay R is changed over from $S_{9a}$ to $S_{9b}$ and is conducted through to the motor circuit, but as the release button 35 is pressed, the switch $S_8$ is in OFF state and the motor 27 will not be rotated. As the pressing of the release button 35 is released, the switch $S_8$ is placed in On state and the motor 27 is rotated, then after repeating same action as mentioned above, it is stopped, then the switch $S_9$ of the latching relay R is changed over to $S_{9a}$, retaining its state, then returning to the beginning of this explanation following the same process as mentioned above thus accomplishing single frame photographing.

However, the switch $S_3$ is linked with the wind-up and the shutter charging, wherein the front screen and the rear screen are charged and the gear 17 is rotated in clockwise direction, thus the state of OFF is attained.

Next, in the case of continuous photographing, the change over knob 33 of the electrically driven wind-up device 20 is rotated in the direction of an arrow in FIG. 2, and the pointer mark 33a is set at the continuous feeding C. The switches $S_4$, $S'_4$ are placed in OFF stae, and the switch $S_6$ is also changed over to the state of ON by the insulating pin 34c of the change over knob 33.

When the release button 35 is pressed in the above state, the switch $S_7$ of the release circuit becomes ON, in a similar manner in the single frame feeding mentioned above, and the releasing electro-magnet 32 works, then the release of the camera 1 works. At that time while the switch $S_8$ which functions in an association with the release button 35 is in OFF state, since the switch $S_6$ is in ON state, when the rear screen completion signal switch $S_3$ of the camera 1 becomes ON the switch $S_9$ of the latching relay R is changed over from $S_{9a}$ to $S_{9b}$, forming a motor circuit, driving the motor 27, then the camera 1 is wound up, and the latching relay R is changed over by the wind-up completion signal, thus a release circuit is formed. Thus as long as the release button 35 is pressed similar action as above is repeated, performing the continuous photographing.

However, an important thing in the above mentioned state is the switches $S_5$, $S'_5$ which are placed in parallel with the switches $S_4$, $S'_4$. As the switches $S_5$, $S'_5$ are in OFF state by pressing of the release button 35, the switches $S_2$, $S'_2$ at the camera 1 side are kept retained at OFF state, and no information comes from the information input circuit A, and such information amount as just before the state the release button 35 is pressed is memorized, then proper exposure is retained for each photographing, thus the high impedance input regeneration circuit B regenerates the memorized voltage of the capacitor C without consuming the same each time, by the voltage stored at the capacitor C.

As has been explained above in a TTL sensing single lens reflex EE camera with electronic shutter with an electrically driven wind-up device which is attachable and detachable or which is built in, when the photographing cycle is of continuous feeding, a release button is pressed facing an object to be photographed without any preparatory operation before photographing, then such information amount as corresponding to the brightness of an object at that time is memorized and retained, and continuous photographing can be made with proper exposure as long as a release button is pressed. When the release button is pressed anew after releasing the pressing of the release button, memorizing and retention of new information amount can be made without memorizing the previous information amount with no preparatory action.

Also when the photographing cycle is set at single frame feeding, the information amount is memorized and retained each time photographing is made, and photographing can be made with a same state as when a camera is used by itself.

As has been explained above according to the present invention which has above mentioned arrangement foolproof action can be surely done corresponding to photographing purpose without any resetting action, thus burden of a camera operator can be reduced and is convenient.

In the above mentioned example an exposure time control circuit of a camera needs to have such memory type control circuit used together that object brightness value is memorized in such memorizing device as a photometric sensing time memory capacitor, etc., and at the same time in photographing a CR time limit circuit provided separately is made to have a time limit action in an association with the release of a camera through such high input type transistor circuit as a Darington connection or magnetic field effect type transistor circuit, etc., thus such high input impedance circuit that the memorized value retained in the memorizing device is retained during continuous photographing is provided.

Also in the above mentioned example while about wind up device such attachment type as being mounted to a camera is described, it does not have to be provided separately to a camera, instead same effect can naturally be obtained when it is built in a camera.

What is claimed is:

1. An automatic wind-up device for a camera, having an exposure control device, comprising
    an information input means into which such photographing information such as brightness of an object is put,
    a memorizing means to memorize output value of the above-mentioned information input means, and said memorizing means is connected to the output terminal of the above mentioned information input means,
    an exposure control means which has the above-mentioned memorizing means connected to its input terminal and regenerates such a value as corresponding to the memorized value of the above-mentioned memory means to control exposure time,
    a first switching means to make ON and OFF the connecting relationship between the above-mentioned memory means and the above-mentioned information input means,
    a change over means to change over between a continuous photographing and a single frame photographing, said change over means having a second switching means being connected between the above-mentioned memory means and the above-mentioned information input means, and a wind-up control means to conduct such wind up as corresponding to a continuous photographing and a single frame photographing, wherein said control means has an actuating means to actuate the above-mentioned first switching means.

2. The automatic wind-up device for a camera having an exposure control device as described in claim 1, which further comprises a third switching means connected between the above-mentioned information input means and the memory means, said third switching means being placed in ON position when an automatic wind-up means is not attached to a camera.

3. The automatic wind-up device for a camera having an exposure control device as described in claim 1, which further comprises a fourth switching means which is made to become OFF by pressing action of the release button and is connected in parallel with the above-mentioned second switching means.

4. The automatic wind-up device for a camera having an exposure control device as described in claim 1, in which said wind-up control means comprises a power source, a driving means which is connected between both terminals of said power source and performs shutter charging at a camera side and wind-up of film, an electro-magnetic member which is connected in parallel with the above-mentioned driving means to actuate the releasing function at a camera side, and a latching relay which is connected between both terminals of the above-mentioned power source and has a fifth switching means to place the abovementioned electro-magnetic member and the driving means in an operative state alternatively.

* * * * *